(12) United States Patent
Muschiol et al.

(10) Patent No.: US 6,579,011 B2
(45) Date of Patent: Jun. 17, 2003

(54) ANTIFRICTION BEARING

(75) Inventors: Klaus Muschiol, Schweinfurt (DE); Robert Grüll, Sulzdorf (DE); Armin Olschewski, Schweinfurt (DE); Alfred Weidinger, Oberwerrn (DE)

(73) Assignee: SKF GmbH, Schweinfurt (DE)

( * ) Notice: Subject to any disclaimer, the term of this patent is extended or adjusted under 35 U.S.C. 154(b) by 0 days.

(21) Appl. No.: 09/990,304

(22) Filed: Nov. 23, 2001

(65) Prior Publication Data

US 2002/0061152 A1 May 23, 2002

(30) Foreign Application Priority Data

Nov. 23, 2000 (DE) ...................................... 200 19 969 U

(51) Int. Cl.[7] ................................................ F16C 19/26
(52) U.S. Cl. ........................ 384/568; 384/450; 384/571
(58) Field of Search ................................. 384/568, 571, 384/450, 569, 570

(56) References Cited

U.S. PATENT DOCUMENTS

| 2,664,325 A | 12/1953 | Bergstrom |
| 3,447,849 A | 6/1969 | Harris et al. |
| 6,086,261 A | 7/2000 | Nakagawa et al. |

FOREIGN PATENT DOCUMENTS

| DE | 496492 | 4/1930 |
| DE | 4 96 492 | 4/1930 |
| DE | 1 748 017 | 7/1957 |
| DE | 73 20 320 | 12/1973 |
| DE | 36 43 278 A1 | 6/1988 |
| DE | 197 28 606 A1 | 1/1999 |
| GB | 2 199 621 B | 10/1990 |
| JP | 08-232960 A | 9/1996 |
| JP | 11-201151 A | 7/1999 |
| WO | WO 00/40869 A2 | 7/2000 |

*Primary Examiner*—Lenard A. Footland
(74) *Attorney, Agent, or Firm*—Burns, Doane, Swecker & Mathis, LLP

(57) ABSTRACT

An antifriction bearing includes a plurality of rolling elements each having a lateral surface possessing a conical shape, with the rolling elements being positioned between a conical raceway and a cylindrical raceway to roll along the conical raceway and the cylindrical raceway. The lateral surface of each rolling element forms an angle with a center axis of the rolling element that is 3° at maximum, and the lateral surface of each rolling element has a convex curvature that is superimposed on the conical shape. The bearing can also include a first bearing ring having a running surface constituting one of the conical and cylindrical raceways. An antifriction bearing arrangement incorporating such an antifriction bearing is also provided with a stop element having a stop face contacting the end face of each of the rolling elements.

20 Claims, 6 Drawing Sheets

ANTIFRICTION BEARING

This application is based on and claims priority under 35 U.S.C. §119 with respect to German Application No. 200 19 969.2 filed on Nov. 23, 2000, the entire content of which is incorporated herein by reference.

FIELD OF THE INVENTION

The invention generally relates to a bearing and a bearing arrangement incorporating the bearing. More particularly, the present invention pertains to an antifriction bearing that is designed as a movable bearing and a bearing arrangement in which the antifriction bearing is employed.

BACKGROUND OF THE INVENTION

For an antifriction bearing of relatively high quality to reliably operate over a long period of time, the antifriction bearing typically has to be installed with a defined play or with a defined initial tension. For this reason, it is known in the art to use an antifriction bearing, for example a cylindrical roller bearing, and to adjust the play or the initial tension by widening the inner raceway to the required extent. This procedure has proven successful for a broad range of applications. However, this procedure has also been shown to sometimes suffer from the drawback that an adjustment is possible only within relatively narrow limits. Additionally, the adjustment causes the inner raceway to be subject to very high mechanical stress.

It is also known in the art to design the geometry of the antifriction bearing in such a way that an adjustment is possible without deforming the inner or the outer raceway. German Patentschrift No. 496 492 proposes an antifriction bearing in which the rollers run between a cylindrical and a conical raceway and are themselves conically shaped. To adjust or readjust the antifriction bearing, the rollers are shifted in the axial direction relative to the conical raceway. An antifriction bearing constructed in this way permits simple and precise adjustment and readjustment, but raises some problems regarding the running properties of the bearing. The conical rolling elements rolling along the cylindrical raceway force a sliding movement between the rolling elements and the cylindrical raceway. This sliding movement can cause the running properties of the antifriction bearing to deteriorate and can result in premature wear.

A need thus exists for an antifriction bearing that permits relatively simple adjustment of the play or the initial tension to thus largely reduce or negate problems such as those associated with known antifriction bearings as mentioned above.

SUMMARY OF THE INVENTION

An antifriction bearing includes a first bearing ring and a plurality of rolling elements each having a lateral surface possessing a conical shape, with the rolling elements being positioned between a conical raceway and a cylindrical raceway to roll along the conical raceway and the cylindrical raceway, and with the first bearing ring having a running surface constituting one of the conical raceway and a cylindrical raceway. The lateral surface of each rolling element forms an angle with a center axis of the rolling element that is 3° at maximum, and the lateral surface of each rolling element has a convex curvature that is superimposed on the conical shape.

According to one version of the present invention, the conical raceway is formed by the first running surface of the first bearing ring and the cylindrical raceway is formed by the running surface of a second bearing ring or by the running surface of a machine part such as a shaft.

The antifriction bearing according to the invention has the advantage that it affords a relatively precise and easy-to-handle adjustment of the play or the initial tension in the bearing while at the same time possessing excellent running properties. Excellent running properties and very good adjustability of the play or the initial tension can be achieved if the angle formed by the lateral surface of each rolling element and the center axis of the rolling element is between about 0.5 and 1.5 degrees.

It is particularly advantageous to construct the rolling elements so that the curvature of the lateral surface of each rolling element follows a logarithmic profile.

To facilitate lubrication of the antifriction bearing in its installed state, it is advantageous to provide the first bearing ring, whose cross-section increases from a first axial end segment to a second axial end segment, with at least one radial through-bore in the first axial end segment or at least one continuous radial indentation in the end face of the rolling element adjacent to the first axial end segment.

According to another aspect of the invention, an antifriction bearing includes a cage, a plurality of rolling elements arranged in the cage and positioned between a conical raceway and a cylindrical raceway to roll along the cylindrical raceway and the conical raceway, with each rolling element having an outer surface possessing a conical shape. The outer surface of each rolling element forms an angle with a center axis of the rolling element that is 3° at maximum, and the outer surface of each rolling element has a convex curvature that is superimposed on the conical shape.

In accordance with another aspect of the invention, an antifriction bearing arrangement includes a first machine element, a second machine element, and an antifriction bearing positioned between the first and second machine elements. The antifriction bearing has a plurality of rolling elements each having opposite end faces and an outer surface possessing a conical shape, with the rolling elements being adapted to roll along a conical raceway and a cylindrical raceway. The lateral surface of each rolling element forms an angle with a center axis of the rolling element that is 3° at maximum, and the lateral surface of each rolling element has a convex curvature that is superimposed on the conical shape. In addition, a stop element is provided and has a stop face contacted by the end face of each rolling element.

Advantageously, the stop face is axially movable relative to the antifriction bearing. With the aid of the axial movement of the stop face, a predefined play or a predefined initial tension of the antifriction bearing can be set. In a preferred embodiment, the stop face is convexly curved which, among other things, facilitates the supply of lubricant and/or coolant to the contact area between the stop face and the rolling elements.

The stop element can be made of a non-hardened materials that it possesses a certain degree of elasticity. In addition, to minimize wear of the stop element, the stop element is preferably hardened, especially induction-hardened, in the area of the stop face.

The stop element can be embodied as a nut with an external thread. The nut is preferably equipped with an anti-rotation element in the form of at least one grub screw which interacts with at least one bolt. The stop face can be formed on an axial extension of the nut.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
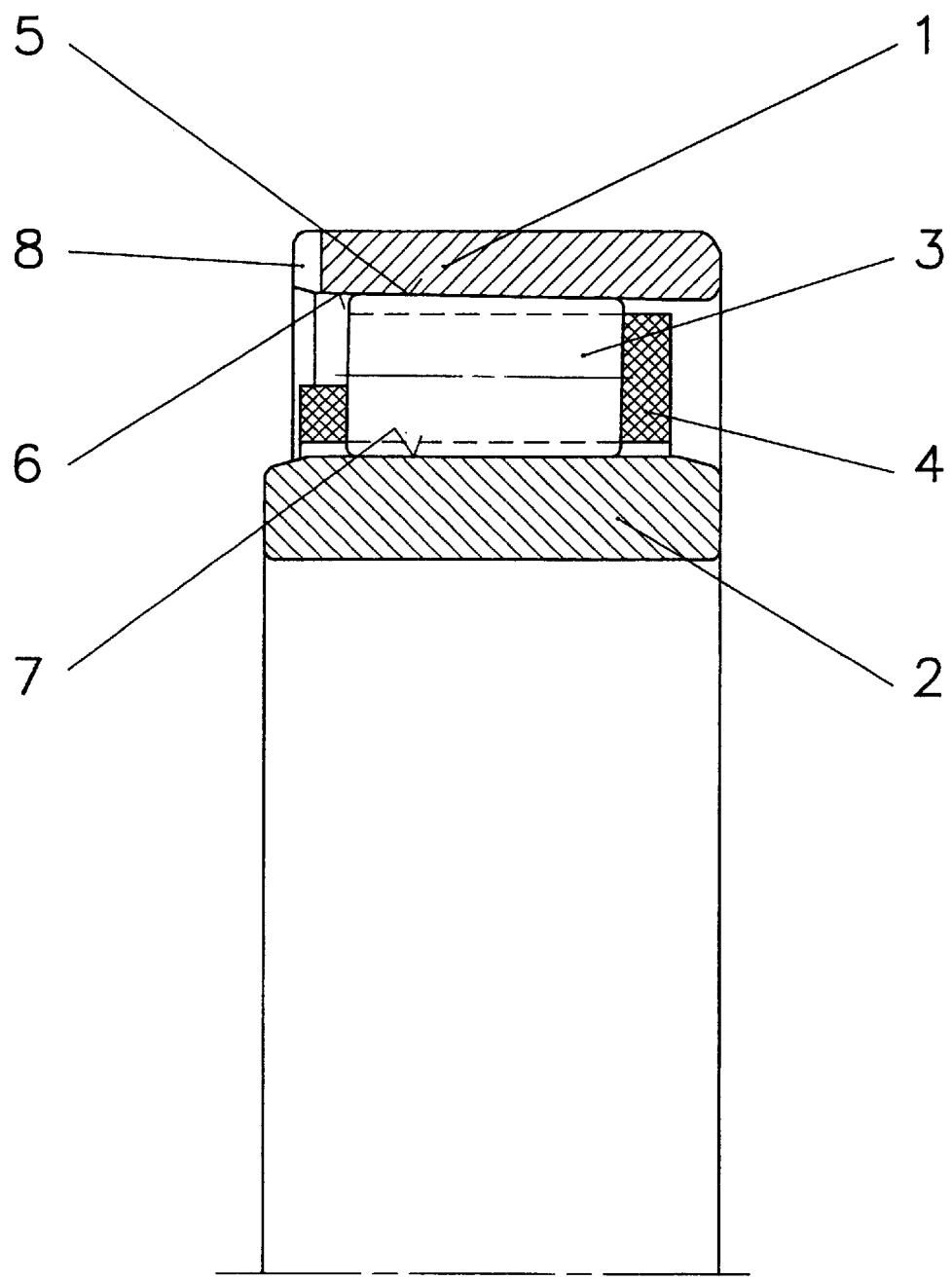
FIG. 1 is a cross-sectional view of an embodiment of the antifriction bearing according to the present invention.
Figure 6:
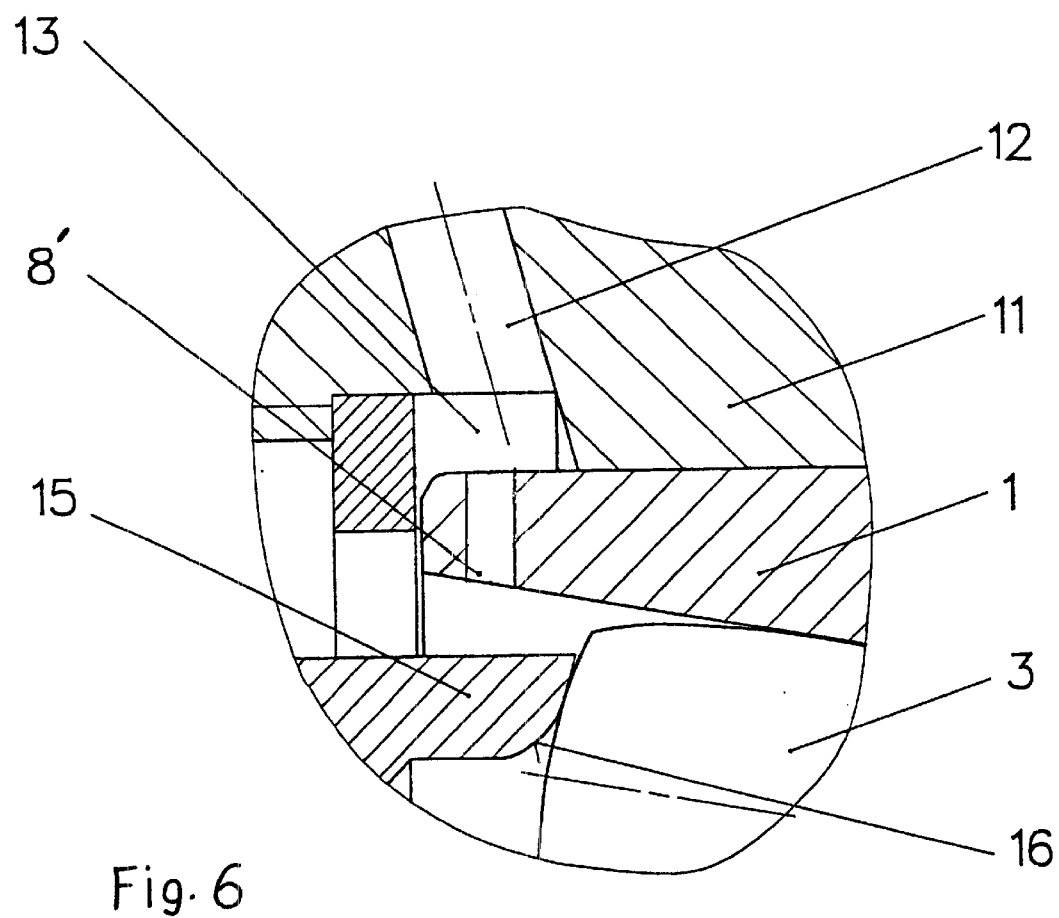
FIG. 6 is an enlarged cross-sectional view similar to FIG. 4 illustrating a portion of the bearing, but with a through bore provided in the bearing ring.

Referring initially to FIG. 1, one embodiment of the antifriction bearing according to the present invention includes an outer race 1, an inner race 2, and rolling elements 3 that roll between the outer race 1 and the inner race 2 and are arranged in a cage 4. The rolling elements 3 have a conical outer lateral surface 5 and roll along the inner lateral surface 6 of the outer ring 1 and the outer lateral surface 7 of the inner ring 2. The inner lateral surface 6 of the outer ring 1 is conical and the outer lateral surface 7 of the inner ring 2 is cylindrical. The outer ring 1, whose cross-section or cross-sectional dimension increases from a first axial end segment (i.e., the left end portion in FIG. 1) to a second axial end segment (i.e., the right end portion in FIG. 1), has a continuous radial indentation 8 in the first axial end segment. This continuous radial indentation 8 is open toward the end face that adjoins the first axial end segment. Instead of the continuous radial indentation 8, a radial through-bore 8' as shown in FIG. 6 may be provided.

Figure 2:
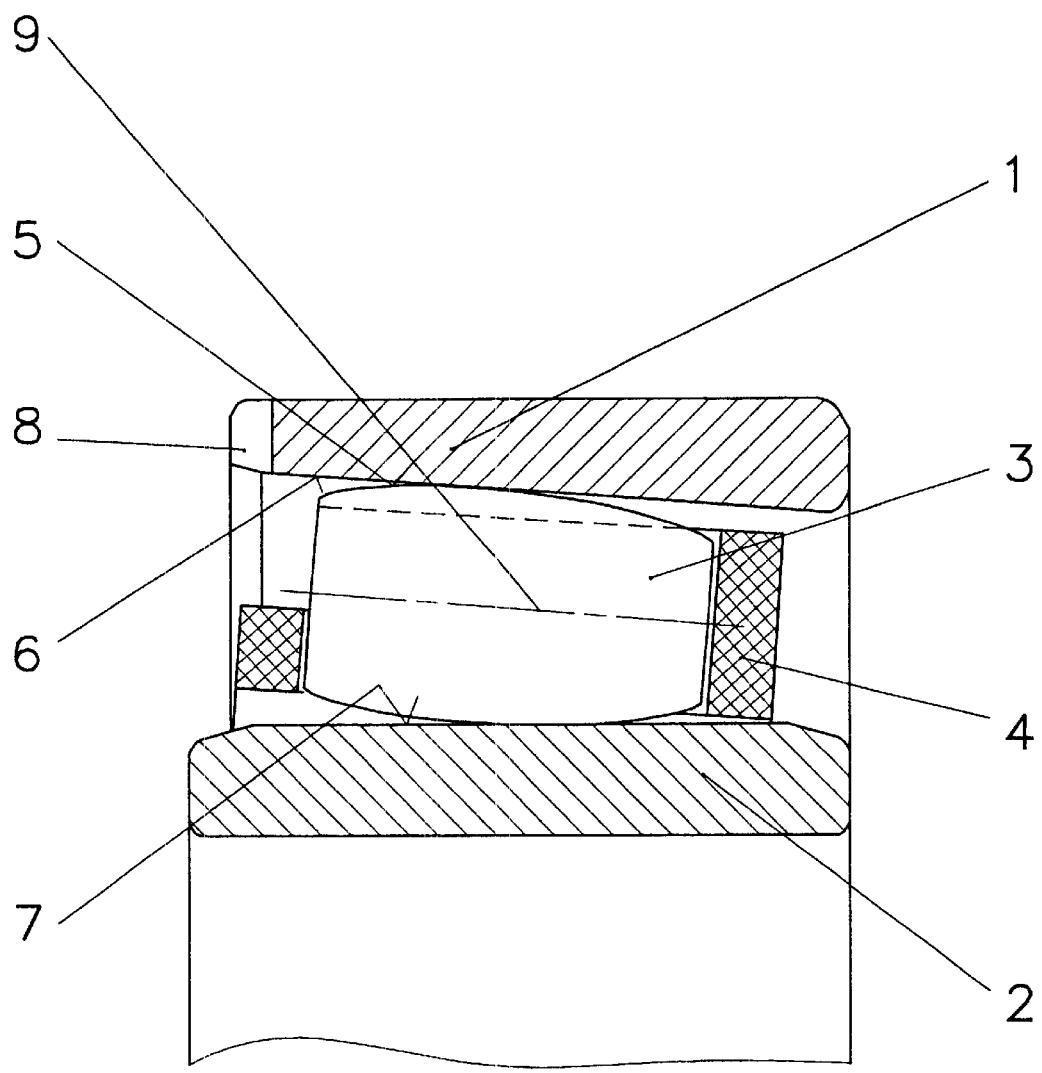
FIG. 2 is an enlarged cross-sectional view of the bearing shown in FIG. 1.

Various details associated with the geometry of the bearing according to the invention are shown in FIG. 2. It is to be understood that FIG. 2 is not true to scale for purposes of illustrating more clearly the characteristics of the antifriction bearing. As depicted in FIG. 2, a convex curvature is superimposed on the conical shape of the lateral surface 5 of the rolling elements 3. Thus, the conical shape of the outer surface of the rolling elements does not change its diameter at a constant rate that results in a straight line, but rather the rate varies, thus resulting in the formation of a curve. In a preferred embodiment, the curvature that is superimposed on the conical shape of the lateral or outer surface 5 of the rolling elements 3 follows a logarithmic profile. The angle resulting from the conical shape without curvature between the lateral surface 5 of each rolling element 3 and the center axis 9 is 3° at maximum. The selection of this angle decisively determines the properties of the bearing and its possible applications. Preferably, an angle of between 0.5° and 1.5° is selected.

In the geometry depicted in FIG. 2, the rolling elements 3 are in nearly or substantially point-like contact with the outer race 1 and the inner race 2 as long as the antifriction bearing is not under load or only under minimal load. This permits the rolling elements 3 to roll along the conical outer lateral surface 7 of inner race 2 without any major sliding effects. If the load on the bearing increases, the outer race 1 and the inner race 2 increasingly conform to the rolling elements 3 so that contact takes place over a larger axial area and the required load rating is thus ensured.

Figure 3:
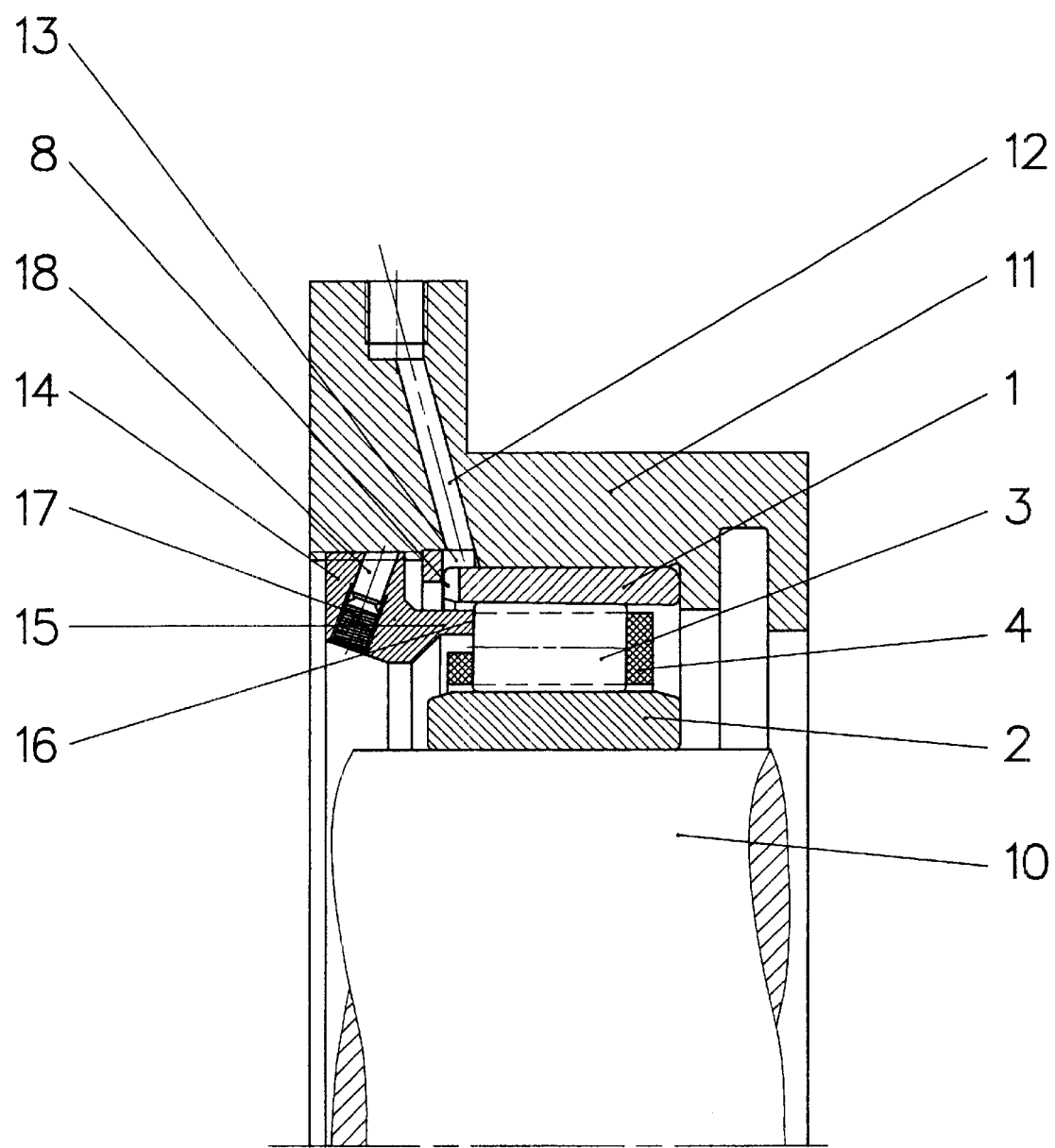
FIG. 3 is a cross-sectional view of an embodiment of the antifriction bearing according to the present invention.
Figure 4:
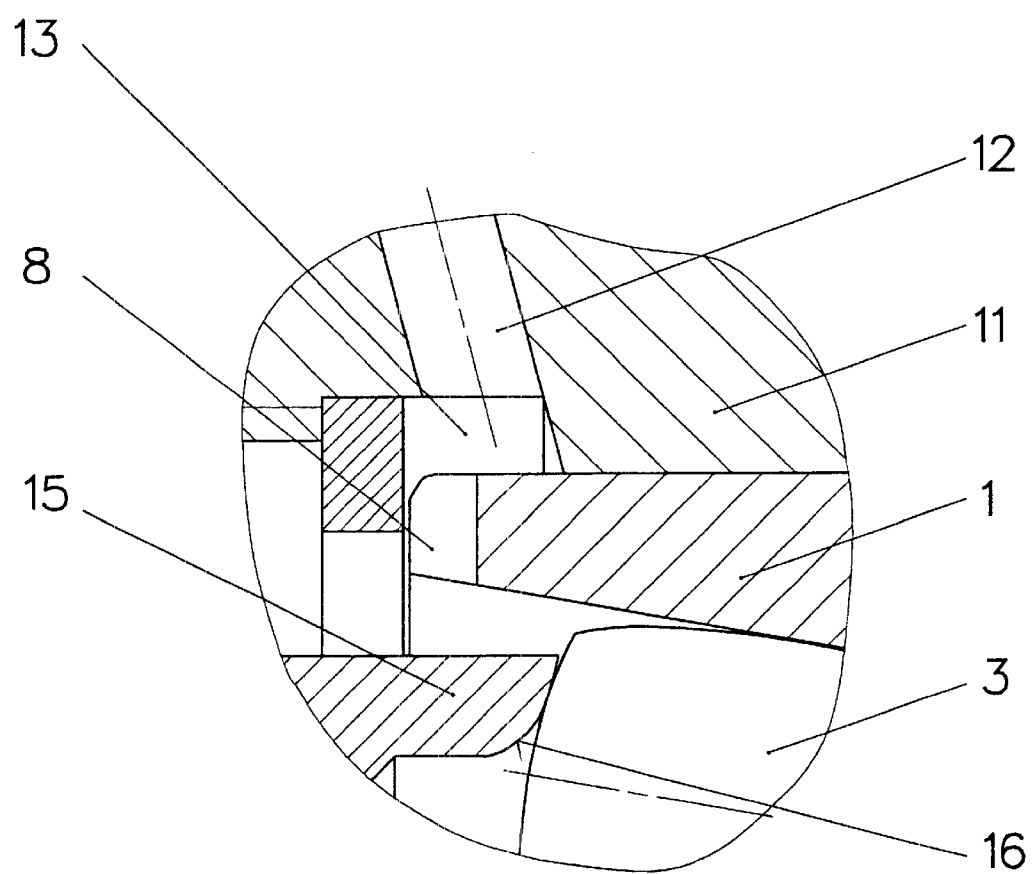
FIG. 4 is an enlarged cross-sectional view of a portion of the bearing shown in FIG. 3.

FIG. 3 illustrates in cross-section one example of an antifriction bearing arrangement utilizing the antifriction bearing of the present invention, with FIG. 4 illustrating in an enlarged manner details associated with the arrangement. In the depicted example, the antifriction bearing serves to support a machine element 10 which in the illustrated embodiment is a shaft. The inner race 2 is pressed onto the shaft 10 and the outer race 1 is pressed into another machine element 11 which in the illustrated embodiment is a housing 11. The housing 11 has at least one generally radially extending through-channel 12 which opens into an annular circumferential gap 13 in the area of the continuous radial indentation 8 (radial through bore 8') that is provided in the outer race.

A nut 14 is positioned axially adjacent to the antifriction bearing. The nut 14 has an external thread is screwed into or threadably engaged with the housing 11. The nut 14 is equipped with an axial extension 15 having a stop face 16. This nut 14 is secured against rotation by three grub screws 17, each of which acts on a respective bolt 18. To eliminate the play between the nut 14 and the housing 11 by way of the grub screws 17, while at the same time permitting a plane-parallel alignment of the nut 14, the grub screws 17 and the associated bolts 18 do not precisely point in the radial direction but form an angle other than zero degrees with the radial direction. The external thread of the nut 14 is formed in the radially, outwardly directed end faces of the bolts 18. The nut 14 is preferably hardened only in the area of the stop face 16. This can be achieved, for instance, through use of an induction hardening process. The stop face 16 of the nut 14 contacts one of the two end faces of the rolling elements 3. To permit a simple adjustment of the play or the initial tension of the antifriction bearing, the end face of the rolling elements 3 possessing the larger diameter is selected as the stop face of the rolling elements.

As can be best seen from FIG. 4, the stop face 16 of the nut 14 has a convex curvature in cross-section. As a result, depending on the geometry of the end faces of the rolling elements 3, contact between the stop face 16 and the rolling elements 3 is linear or point-like. This geometry makes it possible to keep friction and wear relatively low. It also facilitates the supply of lubricant and/or coolant, particularly in cooperation with the continuous radial indentation 8 or radial through bore 8' of the outer race 1 as well as the channel 12 and the annular gap 13.

To adjust or change the play or the initial tension of the antifriction bearing, the grub screws 17 are loosened and the stop face 16 is brought into the desired position by axially rotating the nut 14. Depending on the direction of rotation, the rolling elements 3 move closer to the outer race 1 and the inner race 2 or move away from the outer race 1 and the inner race 2. When the desired position is reached, the nut 14 is fixed by way of the grub screws 17 and the bolts 18. The antifriction bearing arrangement according to the invention is thus suitable for rapid and precise adjustment of the bearing play or the initial tension.

Figure 5:
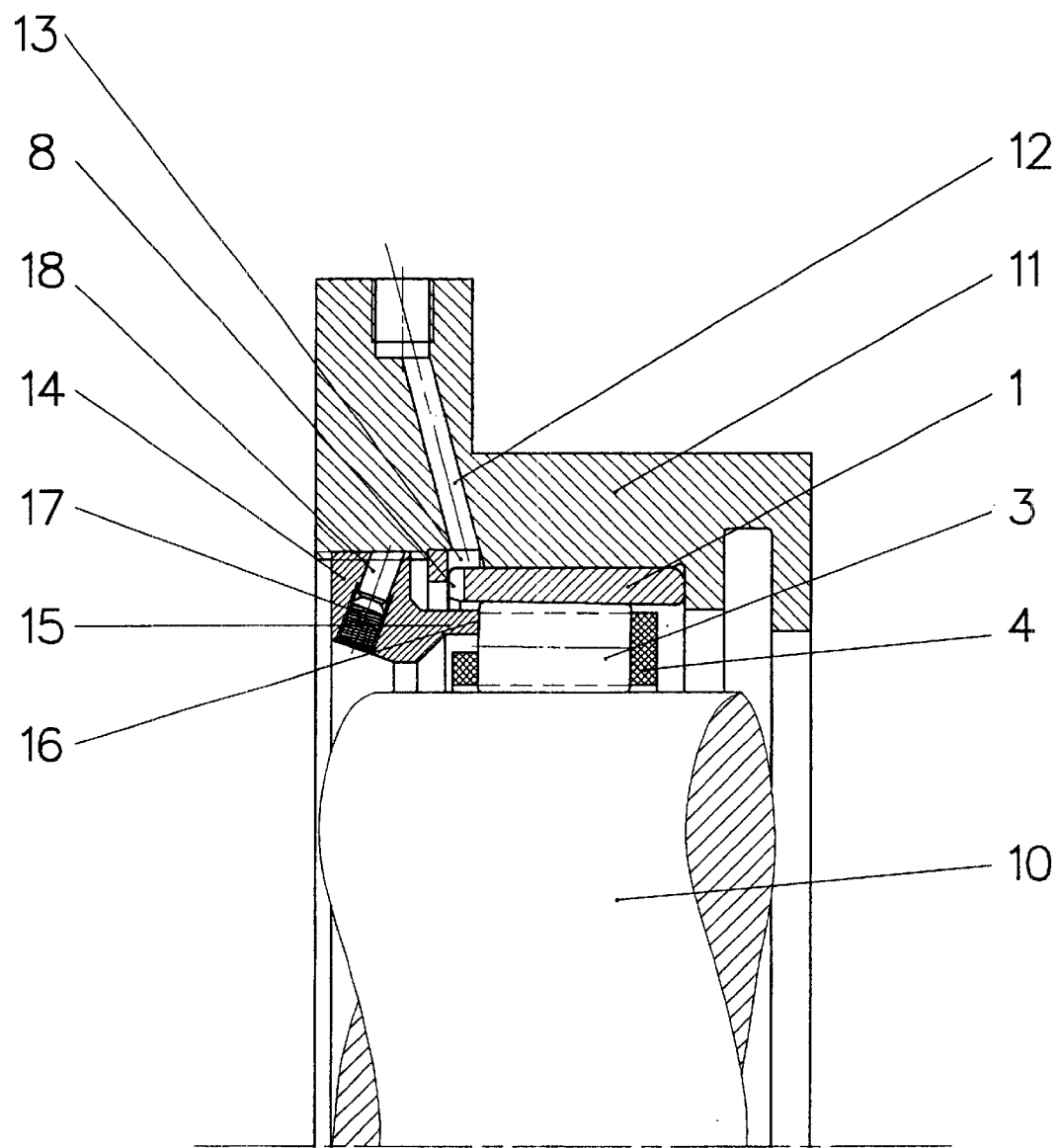
FIG. 5 is a cross-sectional view of another embodiment of the antifriction bearing according to the present invention.

FIG. 5 shows another embodiment of the antifriction bearing arrangement according to the invention. This embodiment differs from the embodiment shown in FIG. 3 in that the inner race 2 is absent. Instead, in the embodiment shows in FIG. 5, the rolling elements 3 are positioned or run along shaft 10.

In principle, the outer race 1 can also be eliminated so that the rolling elements 3 are positioned or run directly along the housing 11.

In a further variation on the present invention, the inner lateral surface 6 of the outer race 1 can be made cylindrical while the outer lateral surface 7 of the inner race 2 is conical.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An antifriction bearing comprising:
   a first bearing ring;
   a plurality of rolling elements each having a lateral surface possessing a conical shape, the rolling elements being positioned between a conical raceway and a cylindrical raceway to roll along the conical raceway and the cylindrical raceway, the first bearing ring having a running surface constituting one of the conical raceway and a cylindrical raceway;
   the lateral surface of each rolling element forming an angle with a center axis of the rolling element that is 3° at maximum; and
   the lateral surface of each rolling element having a convex curvature that is superimposed on the conical shape.

2. The antifriction bearing according to claim 1, wherein the first bearing ring has oppositely located end faces, the first bearing having either a radial through-bore or a continuous radial indentation in one of the end faces.

3. The antifriction bearing according to claim 2, including a second bearing ring having a running surface constituting the cylindrical raceway.

4. The antifriction bearing according to claim 1, including a second bearing ring having a running surface constituting the cylindrical raceway.

5. The antifriction bearing according to claim 1, wherein the cylindrical raceway is constituted by an outer surface of a shaft.

6. The antifriction bearing according to claim 1, wherein the conical raceway is constituted by the running surface of the first bearing ring.

7. The antifriction bearing according to claim 6, wherein the angle between the lateral surface of each rolling elements and the center axis of the rolling element is between 0.5° and 1.5°.

8. The antifriction bearing according to claim 1, wherein the convex curvature of the lateral surface of each rolling element follows a logarithmic profile.

9. The antifriction bearing according to claim 1, wherein the angle between the lateral surface of each rolling elements and the center axis of the rolling element is between 0.5° and 1.5°.

10. An antifriction bearing comprising:
    a conical raceway;
    a cylindrical raceway;
    a cage;
    a plurality of rolling elements arranged in the cage and positioned between the conical raceway and the cylindrical raceway to roll along the cylindrical raceway and the conical raceway, each rolling element having an outer surface possessing a conical shape;
    the outer surface of each rolling element forming an angle with a center axis of the rolling element that is 3° at maximum; and
    the outer surface of each rolling element having a convex curvature that is superimposed on the conical shape.

11. The antifriction bearing according to claim 10, including a first bearing ring having an inner surface and a second bearing ring having an outer surface, the conical raceway being constituted by either the inner surface of the outer bearing ring or the outer surface of the inner bearing ring, and the cylindrical raceway being constituted by the other of the inner surface of the outer bearing ring and the outer surface of the inner bearing ring, one end of one of the first and second bearing rings being provide with a radially extending through bore.

12. An antifriction bearing arrangement, comprising:
    a first machine element;
    a second machine element;
    an antifriction bearing positioned between the first and second machine elements, the antifriction bearing including a plurality of rolling elements each having opposite end faces and an outer surface possessing a conical shape, the rolling elements being adapted to roll along a conical raceway and a cylindrical raceway;
    the lateral surface of each of the rolling element forming an angle with a center axis of the rolling element that is 3° at maximum;
    the lateral surface of each rolling element having a convex curvature that is superimposed on the conical shape;
    a stop element having a stop face contacted by one of the end faces of each of the rolling elements.

13. The antifriction bearing arrangement according to claim 12, wherein the stop face is axially movable relative to the antifriction bearing to set a predefined play or a predefined initial tension of the antifriction bearing.

14. The antifriction bearing arrangement according to claim 12, wherein the stop face is convexly curved.

15. The antifriction bearing arrangement according to claim 12, wherein the stop element is made of a non-hardened material.

16. The antifriction bearing arrangement according to claim 12, wherein the stop element is hardened in the area of the stop face.

17. The antifriction bearing arrangement according to claim 12, wherein the stop element is induction-hardened in the area of the stop face.

18. The antifriction bearing arrangement according to claim 12, wherein the stop element is a nut provided with an external thread.

19. The antifriction bearing arrangement according to claim 18, wherein the nut includes at least one grub screw that interacts with at least one bolt to form an anti-rotation element.

20. The antifriction bearing arrangement according to claim 18, wherein the stop face is an axial extension of the nut.

\* \* \* \* \*